United States Patent
Howarth

(10) Patent No.: US 9,239,764 B2
(45) Date of Patent: *Jan. 19, 2016

(54) PROVISIONING AND REDUNDANCY FOR RFID MIDDLEWARE SERVERS

(71) Applicant: Cisco Technology, Inc., San Jose, CA (US)

(72) Inventor: Arthur G. Howarth, Orleans (CA)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/229,982

(22) Filed: Mar. 30, 2014

(65) Prior Publication Data
US 2014/0215261 A1 Jul. 31, 2014

Related U.S. Application Data

(63) Continuation of application No. 12/874,773, filed on Sep. 2, 2010, now Pat. No. 8,700,778.

(51) Int. Cl.
| G06F 15/173 | (2006.01) |
| G06F 15/177 | (2006.01) |
| H04W 24/00 | (2009.01) |
| G06F 11/20 | (2006.01) |
| H04L 29/12 | (2006.01) |
| H04L 29/08 | (2006.01) |
| H04L 29/14 | (2006.01) |
| H04W 4/02 | (2009.01) |

(52) U.S. Cl.
CPC ........ *G06F 11/2007* (2013.01); *H04L 61/2015* (2013.01); *H04L 67/125* (2013.01); *H04L 67/18* (2013.01); *H04L 67/28* (2013.01); *H04L 67/2819* (2013.01); *H04L 69/40* (2013.01); *H04W 4/023* (2013.01); *H04W 4/02* (2013.01)

(58) Field of Classification Search
None
See application file for complete search history.

(56) References Cited

U.S. PATENT DOCUMENTS

| 7,568,015 | B2* | 7/2009 | Wang et al. ............... 709/220 |
| 7,590,739 | B2* | 9/2009 | Swildens et al. .......... 709/226 |
| 2002/0075805 | A1* | 6/2002 | Gupta et al. ............... 370/235 |
| 2005/0198228 | A1* | 9/2005 | Bajwa et al. ............... 709/220 |
| 2006/0053234 | A1* | 3/2006 | Kumar et al. ............... 710/11 |
| 2006/0089935 | A1* | 4/2006 | Clifford et al. ............. 707/10 |

* cited by examiner

Primary Examiner — Peling Shaw

(57) ABSTRACT

The present invention provides for the provisioning and redundancy of RFID middleware servers. Middleware servers can be automatically provisioned and RFID device/middleware server associations can be automatically updated. Some implementations of the invention provide for automatic detection of middleware server malfunctions. Some such implementations provide for automated provisioning and automated updating of RFID device/middleware server associations, whether a middleware server is automatically brought online or is manually replaced. Changes and reassignments of the RFID device populations may be accommodated.

20 Claims, 17 Drawing Sheets

DNS Table
A.Door235.W14.RFID.cisco.com, 1.1.1.1
B.Door235.W14.RFID.cisco.com, 1.1.1.2
C.Door235.W14.RFID.cisco.com, 1.1.1.3
mw-srv-1.W14.RFID.cisco.com, 1.1.2.1
mw-srv-2.W14.RFID.cisco.com, 1.1.2.2

Fig. 3D

DNS Table
A.Door235.W14.RFID.cisco.com, 1.1.1.1
    TXT  mw-srv-1.W14.RFID.cisco.com
B.Door235.W14.RFID.cisco.com, 1.1.1.2
    TXT  mw-srv-2.W14.RFID.cisco.com
C.Door235.W14.RFID.cisco.com, 1.1.1.3
    TXT  mw-srv-1.W14.RFID.cisco.com
mw-srv-1.W14.RFID.cisco.com, 1.1.2.1
mw-srv-2.W14.RFID.cisco.com, 1.1.2.2
W14.RFID.cisco.com

*Fig. 3F*

PROVISIONING AND REDUNDANCY FOR RFID MIDDLEWARE SERVERS

RELATED APPLICATIONS

This application is a continuation of U.S. patent application Ser. No. 12/874,773, entitled "Provisioning and Redundancy for RFID Middleware Servers," filed on Sep. 2, 2010, now U.S. Pat. No. 8,700,778, issued Apr. 15, 2014, which is a divisional application and claims priority from U.S. patent application Ser. No. 11/182,312, entitled "Provisioning and Redundancy for RFID Middleware Servers," filed on Jul. 14, 2005, now U.S. Pat. No. 7,953,826, issued May 31, 2011, each of which is incorporated herein by reference for all purposes.

This application is related to U.S. patent application Ser. No. 10/866,506, entitled "Methods and Devices for Uniquely Provisioning RFID Devices" and filed on Jun. 9, 2004, now U.S. Pat. No. 7,322,523, issued Jan. 29, 2008, to U.S. patent application Ser. No. 10/866,507, entitled "Methods and Devices for Locating and Uniquely Provisioning RFID Devices" and filed on Jun. 9, 2004, now U.S. Pat. No. 7,336,175, issued Feb. 26, 2008, to U.S. patent application Ser. No. 10/866,285, entitled "Methods and Devices for Assigning RFID Device Personality" and filed on Jun. 9, 2004, now U.S. Pat. No. 7,325,734, issued Feb. 5, 2008, to U.S. patent application Ser. No. 10/891,238, entitled "Methods and Devices for Determining the Status of a Device" and filed on Jul. 13, 2004, now U.S. Pat. No. 8,249,953, issued Aug. 21, 2012, to U.S. patent application Ser. No. 10/876,410, entitled "System and Method for Automatically Configuring Switch Ports with Appropriate Features" and filed Jul. 21, 2004, to U.S. patent application Ser. No. 11/010,089, entitled "Methods and Devices for Providing Scalable RFID Networks" and filed on Dec. 9, 2004, now U.S. Pat. No. 7,422,152, issued Sep. 9, 2008, to U.S. patent application Ser. No. 11/104,140, filed on Apr. 11, 2005, entitled "Automated Configuration of Network Device Ports,", now U.S. Pat. No. 8,060,623, issued Nov. 15, 2011, to U.S. patent application Ser. No. 11/119,169, filed on Apr. 29, 2005, entitled "Locating and Provisioning Devices in a Network", now U.S. Pat. No. 7,789,308, issued Sep. 7, 2010, and to U.S. patent application Ser. No. 11/129,709, filed on May 12, 2005, entitled "Locating, Provisioning and Identifying Devices in a Network" (collectively, the "Cross-Referenced Applications"), now U.S. Pat. No. 7,648,070, issued Jan. 19, 2010, all of which are hereby incorporated by reference for all purposes.

FIELD OF THE INVENTION

The present invention relates to provisioning and redundancy for devices in an RFID network.

DESCRIPTION OF THE RELATED ART

Bar codes containing a Universal Product Code ("UPC") have become a nearly ubiquitous feature of modern life. The vast majority of products, as well as packages, containers and other elements in the stream of commerce now bear a bar code to allow for convenient tracking and inventory control.

However, bar codes have some drawbacks. Bar codes are "read only," in that they are merely a printed set of machine-readable parallel bars that cannot be updated. Bar codes cannot transmit information, but instead must be read by a scanner. Bar codes must be scanned within a relatively short distance and must be properly oriented for the bar code to be read.

"Smart labels," generally implemented by RFID tags, have been developed in an effort to address the shortcomings of bar codes and add greater functionality. RFID tags have been used to keep track of items such as airline baggage, items of clothing in a retail environment, cows and highway tolls. As shown in FIG. 1, an RFID tag 100 includes microprocessor 105 and antenna 110. In this example, RFID tag 100 is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

Most RFID tags use one of the Electronic Product Code ("EPC" or "ePC") formats for encoding information. EPC codes may be formed in various lengths (common formats are 64, 96 and 128 bits) and have various types of defined fields, which allow for identification of, e.g., individual products as well as associated information. These formats are defined in various documents in the public domain. One such document is EPC Tag Data Standards Version 1.1 Rev 1.24 (EPCglobal® 2004), which is hereby incorporated by reference for all purposes.

One exemplary RFID tag format is shown in FIG. 1. Here, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

In theory, RFID tags and associated RFID devices (such as RFID readers and printers) could form part of a network for tracking a product (or a group of products) and its history. However, various difficulties have prevented this theory from being realized. One problem that has required considerable time and energy from RF engineers is the development of lower-cost RFID tags with acceptable performance levels. Inductively-coupled RFID tags have acceptable performance levels. These tags include a microprocessor, a metal coil and glass or polymer encapsulating material. Unfortunately, the materials used in inductively-coupled RFID tags make them too expensive for widespread use.

Capacitively-coupled RFID tags use conductive ink instead of the metal coil used in inductive RFID tags. The ink is printed on a paper label by an RFID printer, creating a lower-cost, disposable RFID tag. However, conventional capacitively-coupled RFID tags have a very limited range. In recent years, RF engineers have been striving to extend the range of capacitively-coupled RFID tags.

In part because of the significant efforts that have been expended in solving the foregoing problems, prior art systems and methods for networking RFID devices are rather primitive. RFID devices have only recently been deployed with network interfaces. Device provisioning for prior art RFID devices is not automatic, but instead requires a time-consuming process for configuring each individual device.

Prior art RFID devices and systems are not suitable for large-scale deployment of networks of RFID devices.

Moreover, many RFID devices and related network devices, such as switches and middleware servers, are deployed in a hostile industrial environment (such as a warehouse or factory) by relatively unskilled "IT" personnel. If a device deployed in one location fails, for example, it may simply be removed and replaced by a new device or a device that was deployed in another location.

Currently, RFID middleware is manually configured. RFID readers are statically paired to RFID middleware under current EPCGlobal standards. Moreover, RFID middleware has little to no redundancy. If there is a failure of a middleware server, there is currently no systematic method of determining the failure. Therefore, current methods of failure detection involve expensive IT resources. Worse yet, because there is a one-to-one mapping between middleware servers and groups of RFID readers, if a middleware server goes down the associated readers all go down.

If the RFID device population increases, there is currently no automatic way of provisioning RFID middleware to accommodate the increase. Similarly, if the RFID device population requires middleware assignment change, there is currently no automatic way of changing RFID middleware provisioning. It would be desirable to address at least some of these shortcomings of the prior art.

SUMMARY OF THE INVENTION

The present invention provides for the provisioning and redundancy of RFID middleware servers. Middleware servers can be automatically provisioned and RFID device/middleware server associations can be automatically updated. Some implementations of the invention provide for automatic detection of middleware server malfunctions. Some such implementations provide for automated provisioning and automated updating of RFID device/middleware server associations, whether a middleware server is automatically brought online or is manually replaced. Changes and reassignments of the RFID device populations may be accommodated.

According to some implementations of the invention, a combination of EPC code information and existing networking standards form the basis of identifying and provisioning methods. For implementations using the Dynamic Host Configuration Protocol ("DHCP"), DHCP Options may be used to pass identification, location and provisioning information. For example, selected DHCP Options may be used to indicate a device type, to provide an EPC code uniquely identifying the particular device, indicating the company name using the device and indicating how the device is being used.

In some implementations of the invention, location and ID information included in a DHCPDISCOVER request can be used to determine appropriate configurations for networked devices. Some such implementations of the invention use DHCPINFORM (RFC 2131) and DHCP Options (RFCs 2132 and 3004) to pass current provisioning and personality information. Moreover, some such implementations of the invention use the DHCPFORCERENEW command (RFC 3203) from a DHCP server to initiate an update or to complete reconfiguration, as Required. The DHCP server may be part of a central server or "metaserver."

Some aspects of the invention provide a provisioning method. This method includes the following steps: receiving a DHCPDISCOVER request from an RFID middleware server; determining, based at least in part upon the DHCPDISCOVER request, appropriate provisioning data for the RFID middleware server; and providing the RFID middleware server with at least some of the appropriate provisioning data.

In some implementations, when it is determined that there has been a change in at least one of the RFID middleware server ID and the location information, a complete set of provisioning data is provided.

The determining step may involve determining at least one of (a) whether the RFID middleware server has been moved; (b) whether the RFID middleware server has been replaced; and (c) whether the RFID middleware server is requesting a complete configuration. The determining step may involve inspecting DHCP Option data in the DHCPDISCOVER request.

For example, the determining step may include these steps: determining a first ID and first location information from the DHCPDISCOVER request; and comparing the first ID and first location information with stored second ID and second location information for a known RFID middleware server. The first and second ID may be, for example, an EPC code and a MAC address. The first and second location information may be a switch identifier, a switch port identifier, DHCP option information and/or DHCP header information.

Alternative network management methods are provided by the present invention. One such method includes these steps: determining a failure of a first RFID middleware server; disabling a first switch port of a switch in communication with the first RFID middleware server; allocating RFID devices formerly associated with the first RFID middleware server to a second RFID middleware server; enabling a second switch port in communication with the second RFID middleware server; and automatically provisioning the second RFID middleware server.

Preferably, at least one of the determining, disabling, allocating and enabling steps are performed automatically. The determining step may involve receiving a change-of-state message from the switch and/or a failure determination by a monitor.

The change-of-state message could be, for example, an SNMP trap and/or an indication of a lack of heartbeat.

Some embodiments of the invention provide a network device that includes the following elements: at least one memory for storing middleware server configuration, ID and location information, and for storing associations of middleware servers and RFID devices; a port configured for communication with an RFID network; and at least one logic device. The RFID network includes an active middleware server in communication with a switch via a first switch port, a standby middleware server in communication with the switch via a second switch port and a plurality of RFID devices associated with and in communication with the active middleware server.

At least one logic device is configured to perform the following steps: determine a failure of the first middleware server; instruct the switch to disable the first port; re-assign at least a portion of the plurality of RFID devices to the standby middleware server; instruct the switch to enable the second port; and provision the standby middleware server.

Other implementations of the invention provide a network management method that includes the following steps: inspecting a DHCPDISCOVER request of an RFID device; provisioning the RFID device based, at least in part, upon location information in the DHCPDISCOVER request; and determining whether a middleware server associated with the RFID device supports DHCP ForceRenew. The middleware server can be provisioned via DHCP ForceRenew, when feasible. Otherwise, the middleware server may be reprovisioned, e.g., during a next DHCP lease renewal.

The methods of the present invention may be implemented, at least in part, by hardware and/or software. For example, some embodiments of the invention provide computer programs embodied in machine-readable media. The computer programs include instructions for controlling one or more devices to perform the methods described herein.

BRIEF DESCRIPTION OF THE DRAWINGS

FIGS. 3C-3F are simplified DNS tables that correspond with various stages of methods 300 and 305.

DETAILED DESCRIPTION OF THE INVENTION

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Although the present invention involves methods and devices for locating, identifying and provisioning devices in an RFID network, many aspects of the present invention can be applied to identifying and provisioning devices, including wireless and wired devices, in other types of networks. For example, the present invention may also be used for locating, identifying and provisioning manufacturing devices, networked sensor devices, IPphones, portable digital assistants and related network devices, such as servers and switches. Similarly, although much of the discussion herein applies to implementations using the DHCP protocol, the present invention is not protocol-specific and may be used, for example, in implementations using UPnP, 802.1ab or similar discovery protocols. Likewise, while the implementations described herein refer to exemplary DHCP Options, other DHCP Options and the DHCP header may advantageously be used to implement the present invention.

The methods and devices of the present invention have very broad utility, both in the public and private sectors. Any enterprise needs to keep track of how its equipment is being deployed, whether that equipment is used for commercial purposes, for military purposes, etc. RFID devices that are networked according to the present invention can provide necessary information for allowing enterprises to track equipment and products (or groups of products). The information that will be provided by RFID devices that are networked according to the present invention will be of great benefit for enterprise resource planning, including the planning of manufacturing, distribution, sales and marketing.

Figure 1:
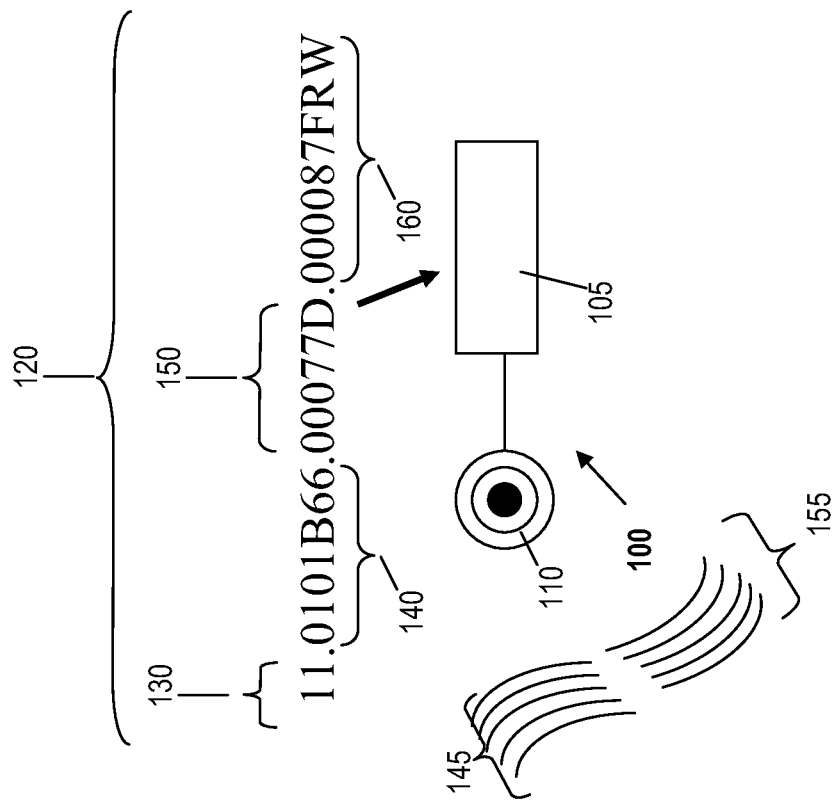
FIG. 1 is a diagram illustrating an RFID tag.
Figure 1:
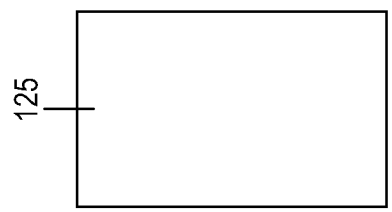
Figure 2:
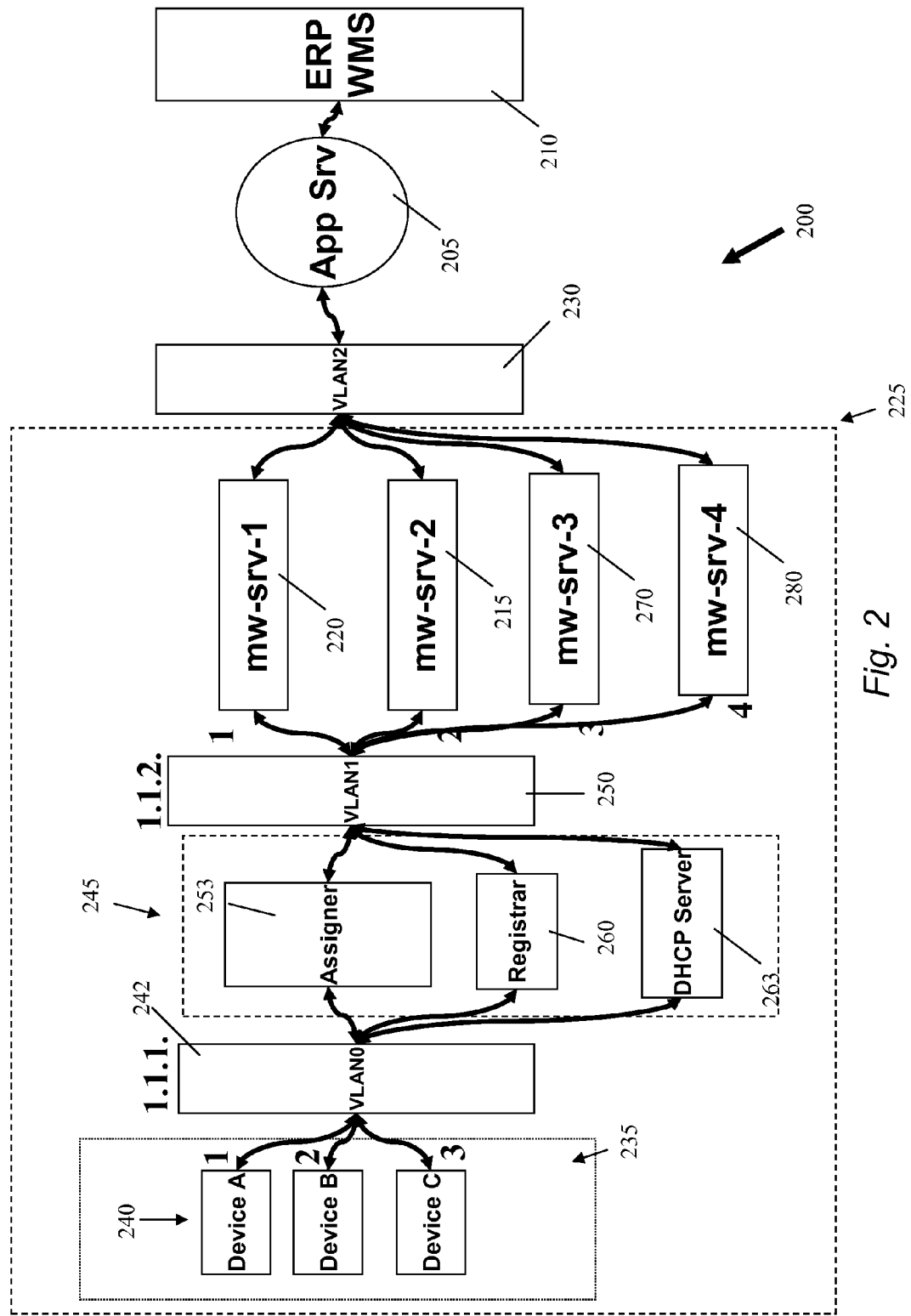
FIG. 2 illustrates an exemplary RFID network according to the present invention.

FIG. 2 illustrates a portion of a simplified RFID network 200 that will be used to describe some implementations of the invention. The details of network 200 are purely illustrative. Application server 205 operates according to instructions from application software 210 that resides in a memory device of, or accessible to, application server 205. Application server 205 is in communication with middleware servers 215 and 220 of site 225, via a virtual local area network ("VLAN") 230 in this example. In this example, at least one of middleware servers 270 and 280 is a standby middleware server, the use of which will be described below.

Site 225, which is "Warehouse 14" in this example, includes numerous locations at which RFID devices are deployed. One such location is door 235, where a plurality of RFID devices 240 are positioned.

RFID devices 240 are in communication with metaserver 245 via VLAN 242. A metaserver will sometimes be referred to herein as a "central server" or the like. As will be discussed in more detail below, in some preferred implementations metaserver 245 includes servers and associated devices that provide various functions, including those of DHCP server 263, assigner 253 and registrar 253. Accordingly, some of the functionality provided by the registrar and assigner as described in the Cross-Referenced Applications will be performed by metaserver 245. In some implementations, metaserver 245 is a single device and in other implementations metaserver 245 is an association of separate physical devices. Metaserver 245 may also include a load balancer. Middleware servers 215, 220, 270 and 280 can communicate with metaserver 245 and registrar 260 via VLAN 250.

Figure 3A:
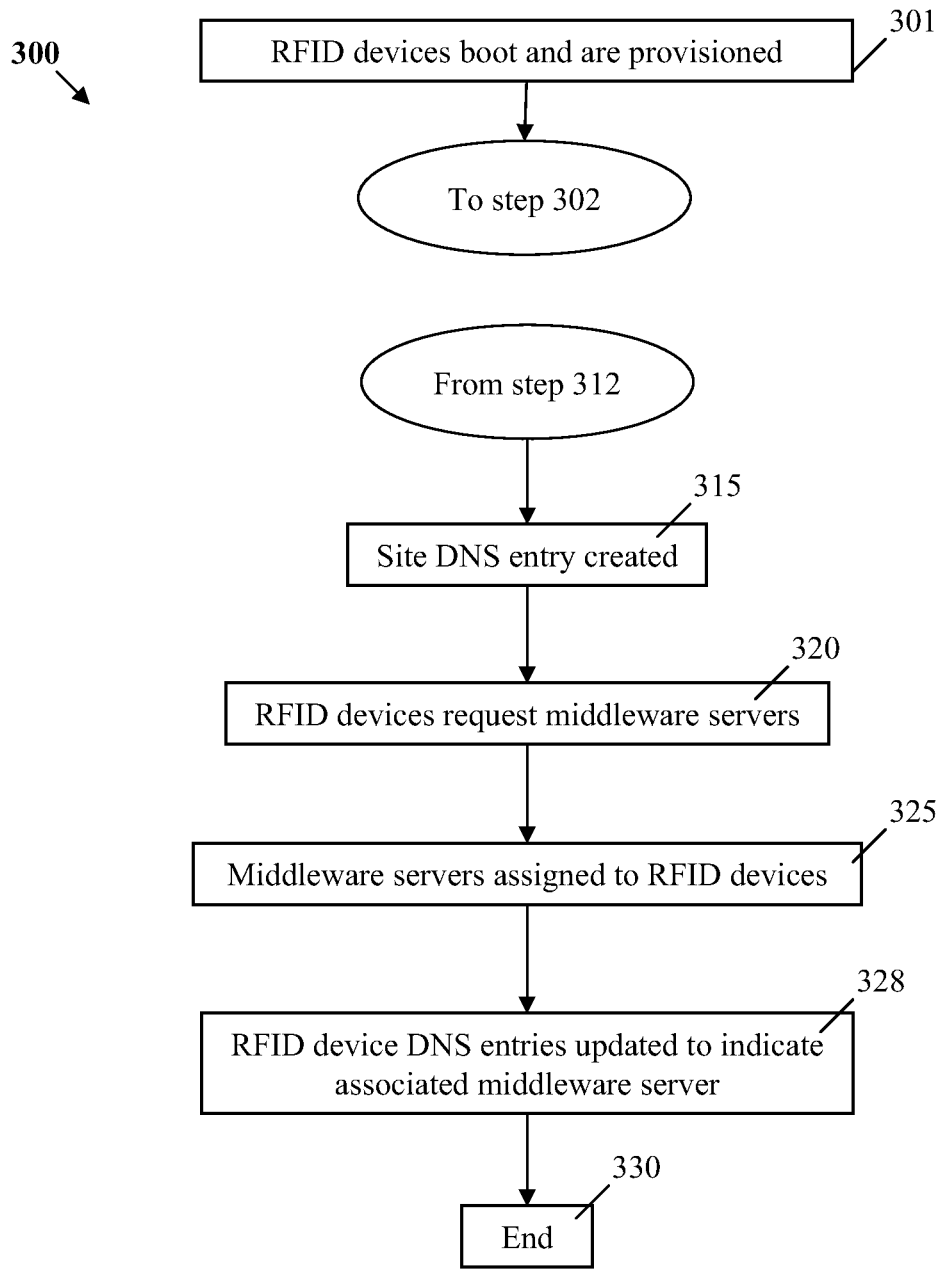
FIGS. 3A and 3B are flow charts that outline methods 300 and 305 of the present invention.

FIG. 3A is a flow chart that provides an overview of method 300 according to the present invention. Those of skill in the art will appreciate that the steps of the methods discussed herein, including method 300, need not be performed (and in some implementations are not performed) in the order shown. Moreover, some implementations of the methods discussed herein may include more or fewer steps than those shown, e.g., in FIG. 3A.

In step 301, RFID devices in a network boot up and are provisioned. The functions a device performs, as well as the unique settings to perform those functions, will be referred to herein as the device "personality." As used herein, "provisioning" a device can include, but is not limited to, providing network configuration, providing personality configuration, incorporating the device into a network database and enabling the device with software. The RFID devices may be dynamically provisioned, for example, according to the methods described in the Cross-Referenced Applications. As described in the Cross-Referenced Applications, the RFID devices can be provided with the network address of DHCP server (e.g., DHCP server 263 of metaserver 245) and instructions for sending a request for a middleware server to the DHCP server.

The DHCP protocol is used in some preferred implementations of the present invention because it offers various convenient features. For example, the DHCP protocol allows pools or "scopes" of TCP/IP addresses to be defined. A DHCP server can temporarily allocate or "lease" these TCP/IP addresses to host devices. An IP address that is not used for the duration of the lease is returned to the pool of unallocated IP addresses. In addition, the DHCP server will provide all related configuration settings, such as the default router, Domain Name Service ("DNS") servers, subnet mask, etc., that are required for the proper functioning of TCP/IP.

For implementations using the DHCP protocol, DHCP Options may be used to pass provisioning information. The DHCP protocol is defined in RFC 2131 and DHCP Options are set forth in, for example, RFCs 2132, 3004 and 3046. RFCs 2131, 2132, 3004 and 3046 are hereby incorporated by reference for all purposes. In some preferred implementations, an EPC corresponding to an RFID device is put inside a DHCP request sent from the RFID device to a DHCP server. The EPC uniquely identifies the RFID device.

Some implementations employ Domain Name Service ("DNS") and dynamic DNS ("DDNS") to allow yet easier identification of RFID devices. RFC 1034 and RFC 1035 are hereby incorporated by reference and for all purposes.

Figure 3B:
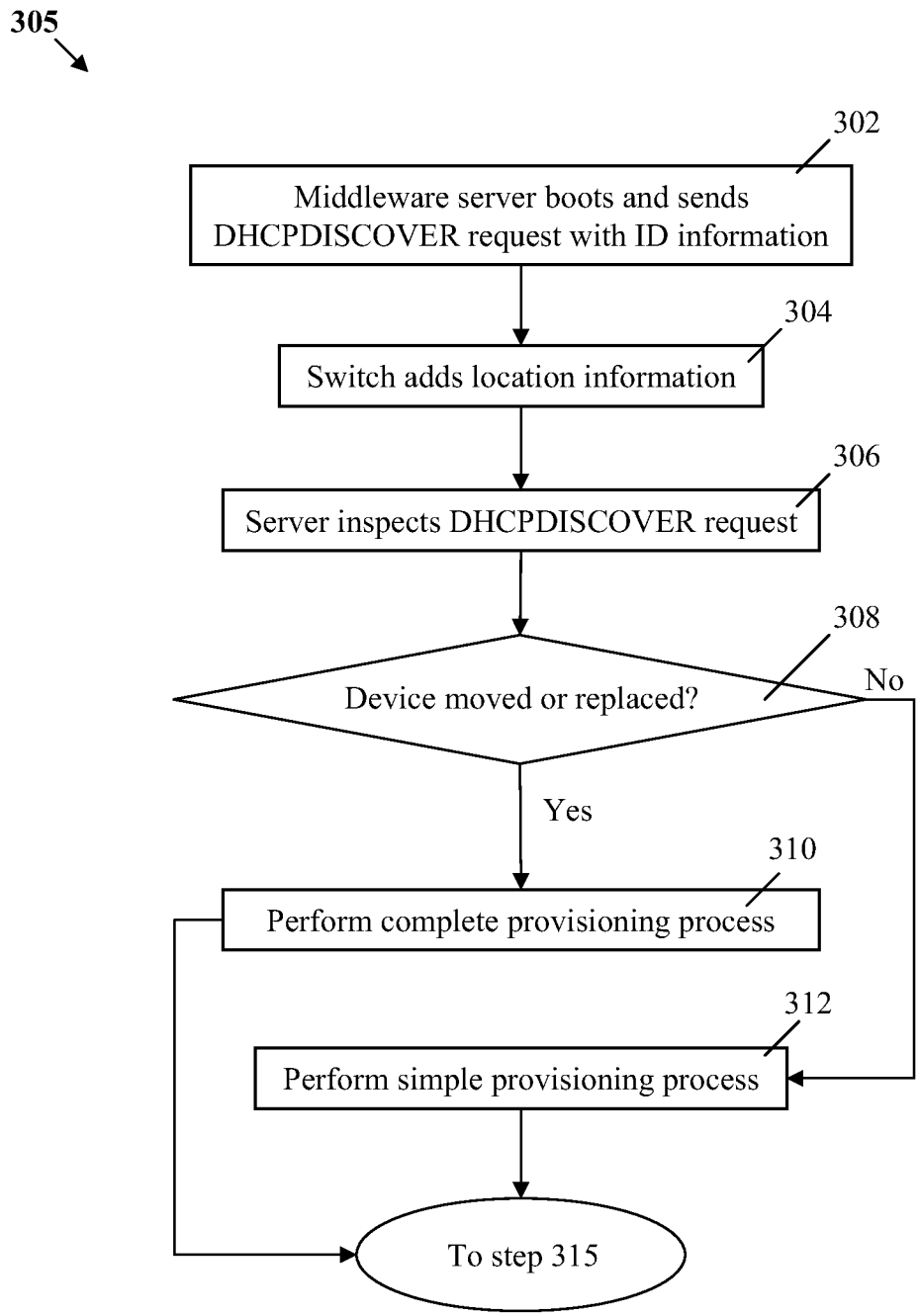
Figure 3C:
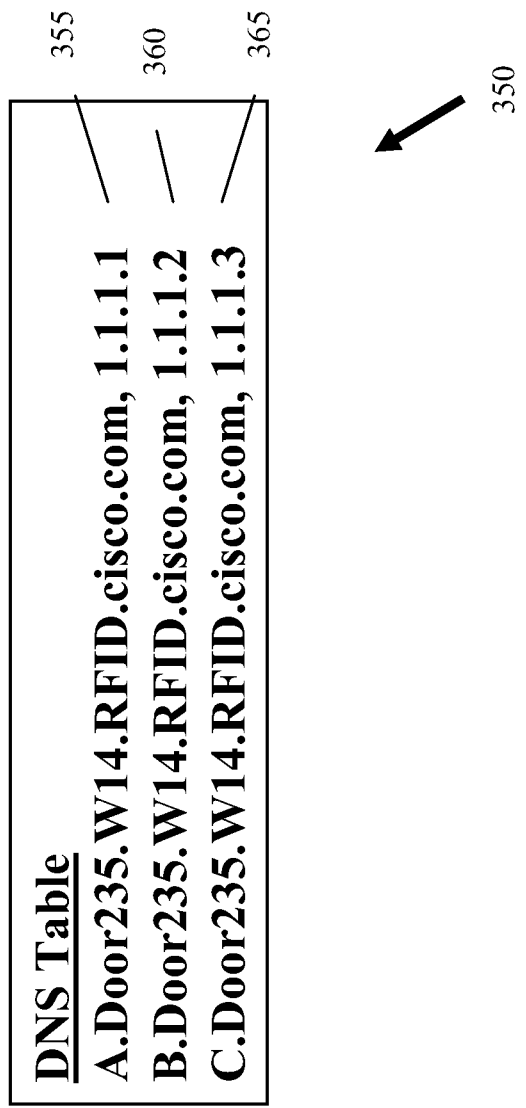

FIG. 3C illustrates one format for DNS entries in a DNS table 350 for RFID devices 240. In this example, DNS Table 350 is stored in 260, but DNS Table 350 could be stored elsewhere in network 200. In DNS table 350, the DNS entries have the following format:

<Device>.<Location>.<Site>.RFID.<Domain>

Accordingly, entry 355 for RFID device A of FIG. 2 includes domain name "A.Door235.W14.RFID.cisco.com" and the associated IP address. Corresponding entries 360 and 365 are formed for RFID devices B and C. One of skill in the art will readily understand that this format is merely one example and that many other suitable formats could be used for this purpose.

Referring to FIG. 3B, in process 305 middleware servers in the network boot up and are provisioned. Process 305 is an automated process; a manual process is described elsewhere herein.

In steps 302 and 304, a middleware server (e.g., middleware server 220 of FIG. 2) initializes and transmits a DHCP-DISCOVER request to a DHCP server (here, DHCP server 263 of metaserver 245) that includes ID information and location information. The ID information and location information may be included in any manner described in the Cross-Referenced Applications with regard to the provisioning of RFID devices. In this example, the ID information includes an EPC code for the middleware server in Option 61 of the DHCPDISCOVER request. However, the ID information could include other types of ID information, such as MAC address information.

Similarly, the location information could take various forms and could be included in the DHCPDISCOVER request in various ways, e.g., including the location information in one or more DHCP Options and/or the header. Here, a switch in communication with the middleware server inserts location information (in the form of switch and port identifiers) in Option 82. (Step 304.)

In step 306, DHCP server 263 (or another component of metaserver 245) inspects the DHCPDISCOVER request to determine (in step 308) whether the middleware server has been moved or replaced. In this example, step 308 involves comparing the middleware ID and location information with stored middleware server ID/location associations. If a known middleware ID is coming from a new location, it is presumed that the middleware server has been moved. If a new middleware server appears in a location previously associated with another middleware server, it is presumed that a middleware server has been replaced. If the middleware server has been moved or replaced, a complete provisioning process is performed. (Step 310.) If the middleware server has not been moved or replaced, a partial provisioning process is performed, e.g., according to a predetermined set of parameters that have been selected by the responsible IT personnel. In one such example, it has been determined that the middleware server will simply be given an IP address and a domain name. (Step 312.)

As part of the provisioning process, middleware servers 215 and 220 are provided with network addresses, including domain names and IP addresses. Accordingly, entries 370 and 375 are added to DNS table 350, as shown in FIG. 3D.

Figure 3E:
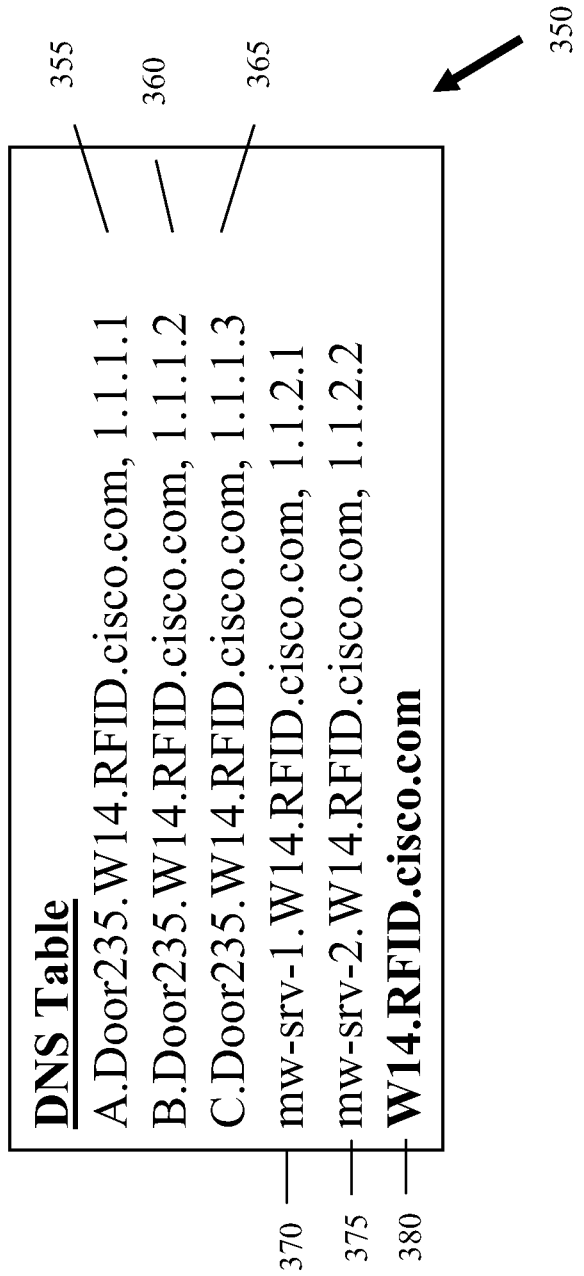

Returning again to FIG. 3A, a site DNS is created for Warehouse 14 in step 315. This entry could be created by application server 205, by another device or manually. Entry 380 of FIG. 3E illustrates such a DNS entry, in the format <site>.RFID.<domain>. In step 320, RFID devices request middleware servers. Here, the RFID devices transmit requests for middleware servers to assigner 253 of metaserver 245. Assigner 253 determines that RFID devices A and C will be associated with middleware server 220 and RFID device B will be associated with middleware server 215 (step 325).

In step 330, the middleware servers update the DNS entry for each RFID device with identification information for the middleware server. In this example, the DNS entry for each RFID device is updated with a TXT record that states the domain name of the associated middleware server.

Accordingly, TXT record 385 ("TXT mw-srv-1.W14.RFID.cisco.com") is added to DNS entry 355 for RFID device A. (See FIG. 3F.) Similarly, TXT record 390 ("TXT mw-srv-2.W14.RFID.cisco.com") is added to DNS entry 360 for RFID device B and TXT record 395 ("TXT mw-srv-1.W14.RFID.cisco.com") is added to DNS entry 365 for RFID device C. Preferably, the same procedure applies if an RFID device is added/replaced after other RFID devices in the network have been initialized, provisioned, etc., as described above.

Although assigner 253 is included in metaserver 245 in this example, assigner 253 could be implemented in various ways, e.g., as a stand-alone device, as hardware and/or software incorporated into a module of another network device, etc. The network device could be, for example, a switch (e.g., a Catalyst 6500 switch provided by Cisco) or a middleware server.

In this example, assigner 253 is a type of load balancer. However, assigner 253 preferably does not re-allocate RFID devices to other middleware servers as frequently as a normal TCP load balancer would re-route network traffic. Instead, assigner 253 preferably re-allocates RFID devices to other middleware servers only when certain conditions exist, e.g., when devices boot up, during a maintenance cycle, when middleware servers are added to the network, etc. Otherwise, the associations between middleware servers and RFID devices would frequently change and the new associations would need to be communicated to other parts of network 200 (e.g., to application server 205).

According to some implementations, the protocol used for the query/response between the RFID device and the metaserver differs from the protocol used in routine communications on the RFID network. In some such implementations of the assigner described herein, the protocol is one used by conventional TCP load balancers.

Figure 4:
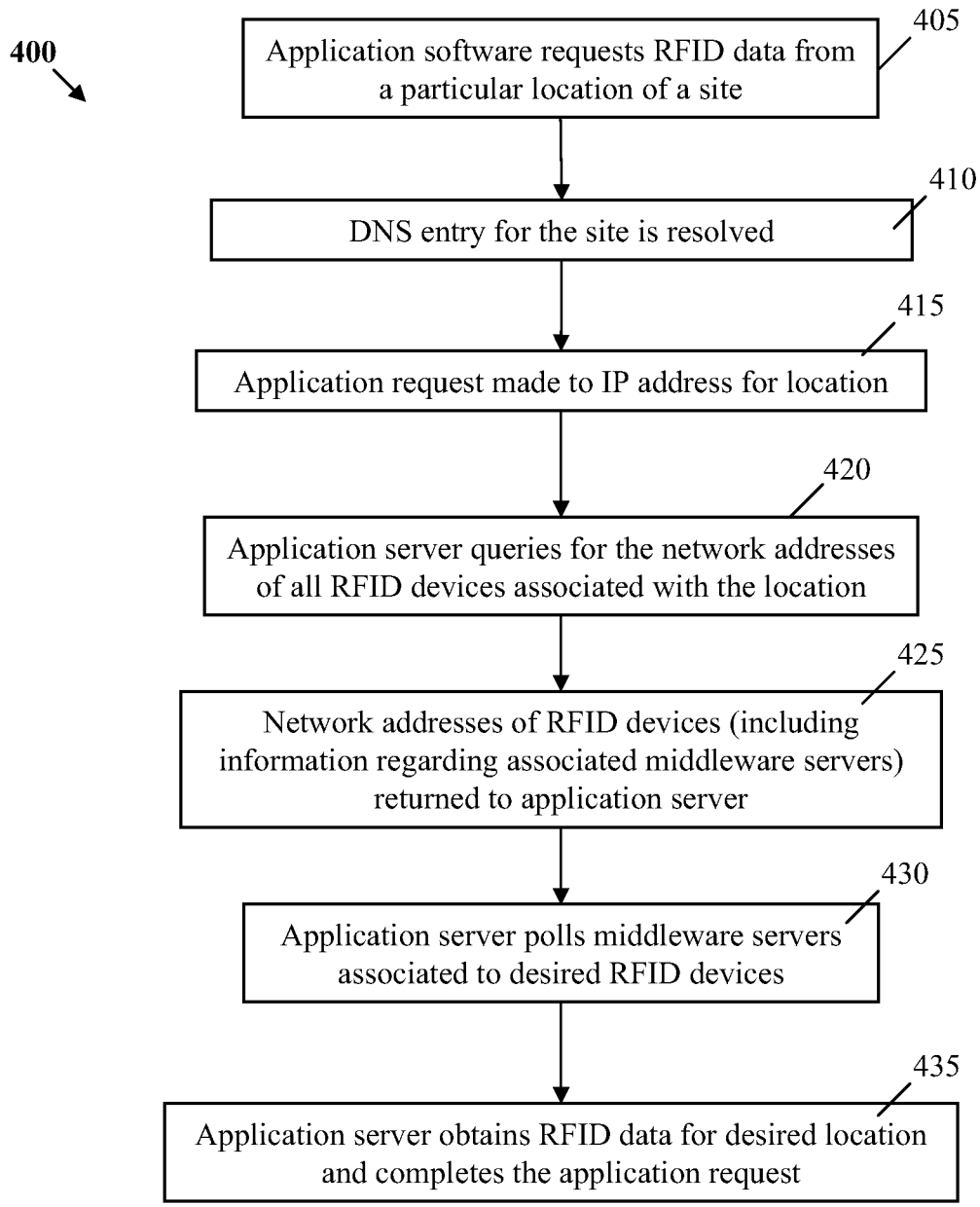
FIG. 4 is a flow chart that outlines method 400 of the present invention.

FIG. 4 is a flowchart that outlines method 400 for obtaining RFID data from a location according to some implementations of the present invention. In step 405, application software 210 requests RFID data from a location. In this example, the location is location 235, which is a door of Warehouse 14. The DNS entry 380 for this site is resolved (step 410) and an application request is made for the IP address for W14, Door 235 (step 415).

In response, application server 205 queries for the network addresses of all RFID devices deployed at door 235, e.g., "*.Door235.W14.RFID.cisco.com." (Step 420) (The asterisk here signifies a search for all entries that match or have entries related to Door 235.) Network addresses for these RFID devices (including the TXT records that indicate associated middleware servers) are returned to application server 205 (step 425). Accordingly, the application server now knows the middleware server associated with each RFID device deployed at door 235 of Warehouse 14. The application server can then poll these middleware servers (step 430) in order to obtain RFID data for door 235 and complete the application request. (Step 435.)

Some methods of the present invention provide for redundancy of middleware servers and dynamic re-assignment of RFID devices from an unavailable middleware server to one or more available middleware servers. The flow charts of FIGS. 5A and 5B outline two such methods according to the present invention.

Figure 5A:
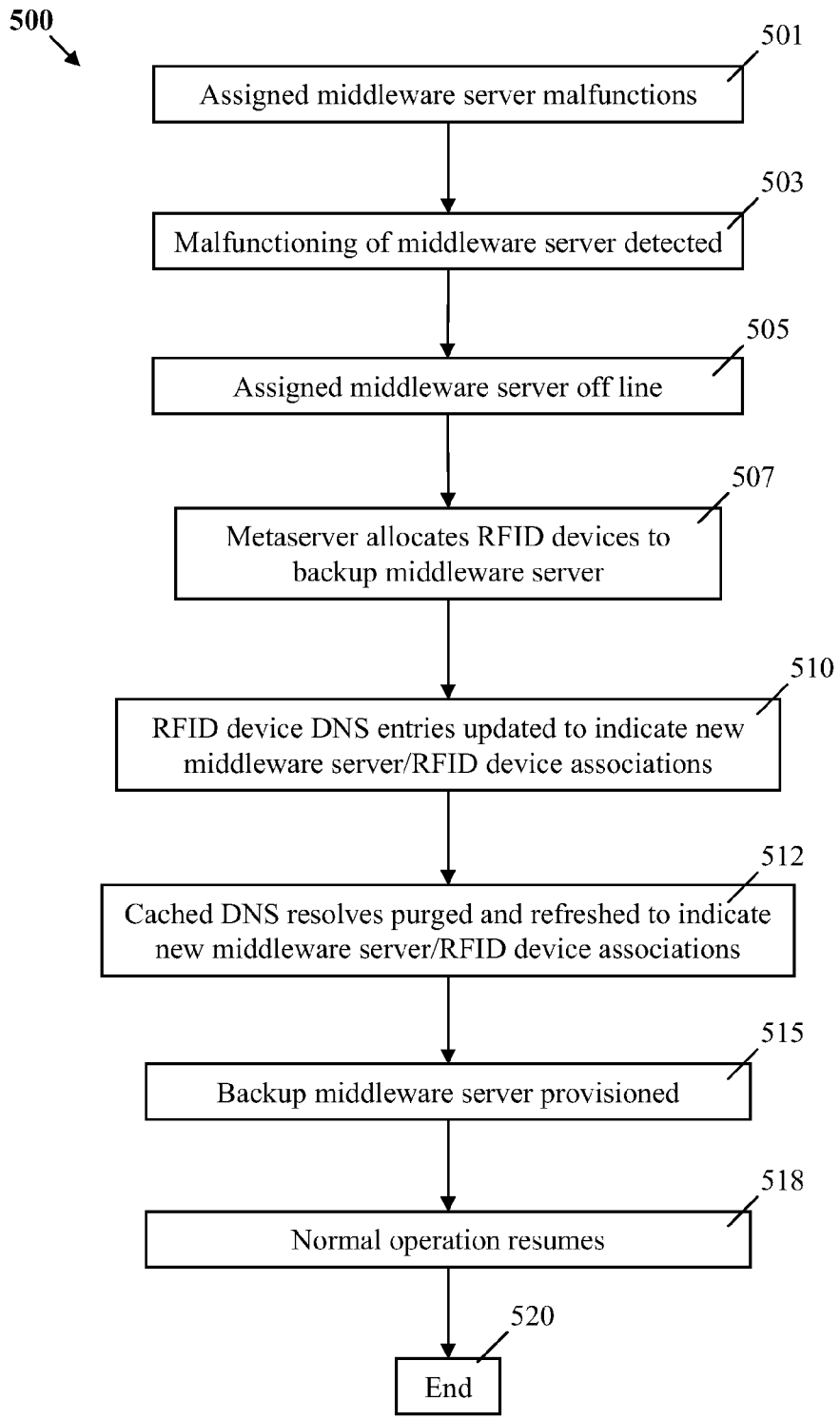
FIGS. 5A-5C are flow charts that outline methods of the present invention.

Method 500 of FIG. 5A outlines an automated process according to some implementations of the invention. Method 500 begins after RFID devices and associated middleware servers have previously been initialized and provisioned, e.g., according to the present invention, and have been "up and running" For example, such devices may be in the condition that would exist upon completion of step 330 of method 300.

In step 501, an assigned middleware server (in this example, middleware server 220) begins to malfunction and in step 503, the malfunctioning condition is detected. For example, step 503 may involve the detection of a change-of-state ("COS") message such as a Simple Network Management Protocol ("SNMP") trap by a network device (e.g., a switch) in communication with the malfunctioning middleware server. Chapter 56 of the Internetworking Technologies Handbook, entitled "Simple Network Management Protocol" (Cisco Systems 2005) is hereby incorporated by reference.

Alternatively, step 503 could manifest in a variety of other ways. For example, step 503 may involve a monitor's detection of a failure condition (e.g., the absence of a heartbeat) and a corresponding message. In another example, before taking a middleware server off line for maintenance and/or a software upgrade, a network administrator could send a signal indicating that the middleware server is no longer available. However step 503 is manifested, the metaserver receives an indication that the middleware server is malfunctioning.

In response, communications with the first middleware server are interrupted in step 505. For example, step 505 may involve the disabling of a switch port with which the first middleware server was in communication, e.g., in response to a command from the metaserver.

In step 507, the metaserver allocates RFID devices formerly associated with the first middleware server to a backup middleware server (e.g., middleware server 270) and the corresponding DNS entries are updated to indicate the new middleware server/RFID device associations (step 510). In alternative implementations, the RFID devices are dynamically re-assigned to other active middleware servers, e.g., as described in the Cross-Referenced Applications (see, e.g., U.S. patent application Ser. No. 11/129,709, FIG. 5 and the corresponding discussion). This procedure could also be performed via an IP Force Renew to the RFID device.

Other components of network 200 should be made aware of the new RFID device/middleware server associations. For example, the cached DNS resolves of application server 205 corresponding to the prior RFID device/middleware server associations need to be purged and the caches need to be refreshed with the new RFID device/middleware server associations (step 512). In some implementations, when an application server can no longer communicate with a middleware server and/or an RFID device, the application server will make a query for the device and use the results of this query to refresh its cache of DNS entries.

Alternatively (or additionally), purging and refreshing of cached DNS resolves is controlled by a time to live ("TTL") indication received from a middleware server with the RFID device/middleware server associations. According to some such alternative implementations, after the TTL has run the application server makes a query for RFID device/middleware server associations and uses the results of this query to refresh its cache of DNS entries.

In step 515, the backup middleware server initializes and is provisioned, preferably in an automated fashion as described elsewhere herein. The RFID network may then resume normal operation. (Step 518.)

If middleware server 220 is later brought back on line, it could be initialized, provisioned, etc. (e.g., as described above). In some implementations, middleware server 220 notifies metaserver 245 that it is back online and metaserver 245 updates a table/database of available middleware servers for site 225. RFID devices could subsequently be assigned to middleware server 220, e.g., as described above.

Figure 5B:
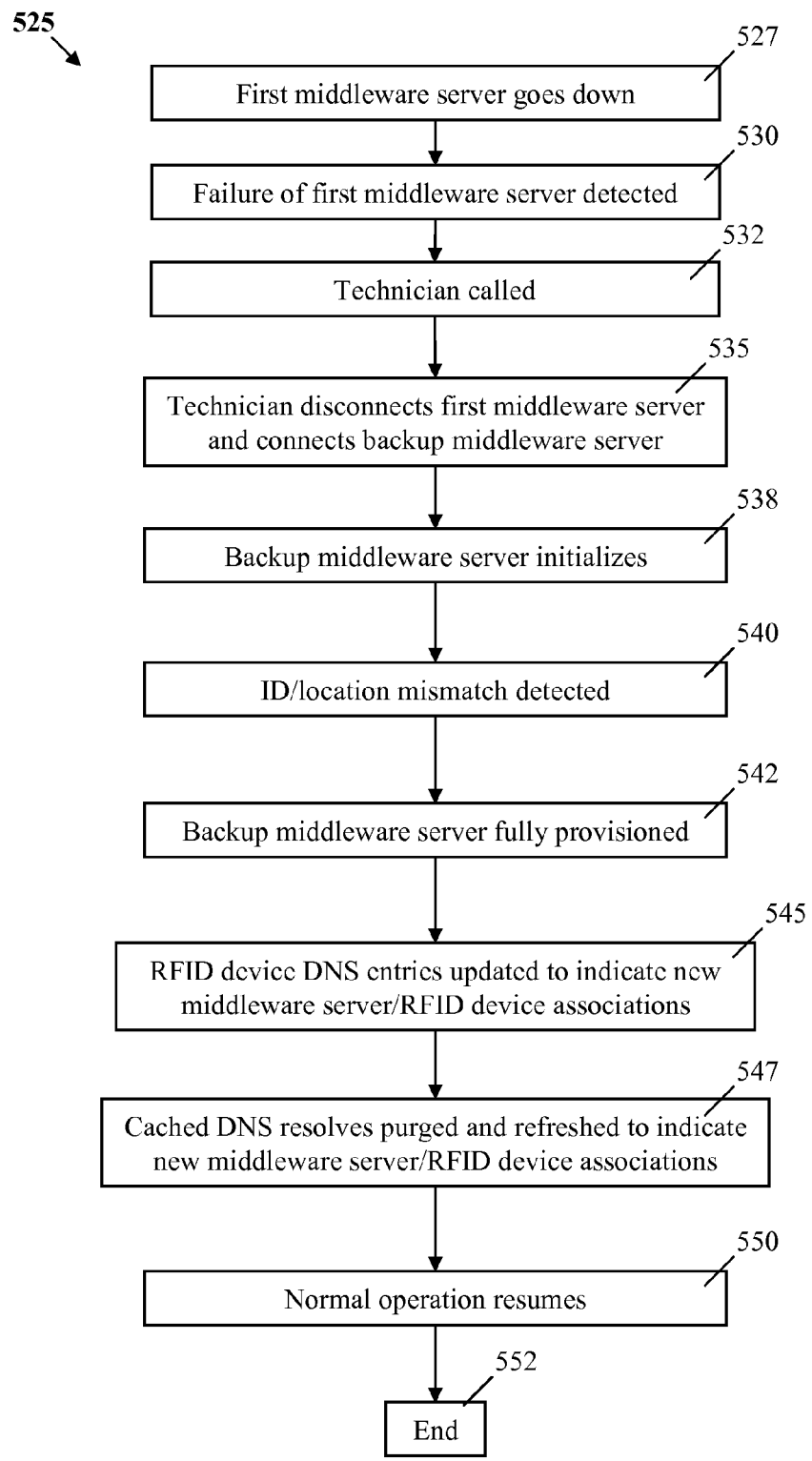

FIG. 5B outlines an alternative method 525 of the invention, which is a partially manual and partially automated process. In step 527, a first middleware server malfunctions and in step 530 the malfunction is detected. In this example, an SNMP trap or the lack of a heartbeat alerts a monitoring station, which may or may not include human operators.

In step 532, the monitoring station contacts a technician, who disconnects the first middleware server and connects a backup middleware server, preferably in the same jack (e.g., an Ethernet jack) to which the first middleware server was connected. (Step 535.) In step 538, the backup middleware server initializes and transmits a DHCPDISCOVER request (including ID and location information) to the metaserver. For example, the ID could be a MAC address and/or an EPC code. The location information could be, e.g., switch and port ID information that has been inserted in DHCP Option 82 by the switch.

The metaserver inspects the DHCPDISCOVER request and determines that a new middleware server has been connected (here, by detecting a mismatch between the location and the middleware server ID). (Step 540.) The metaserver then provisions the new middleware server. (Step 542.) Preferably, the new middleware server is fully provisioned, so that the technician does not need to make potentially erroneous decisions regarding what configurations, etc., need to be changed.

The RFID devices formerly associated with the first middleware server are re-allocated to the new middleware server and the corresponding DNS entries are modified. (Step 545.) In step 547, cached DNS resolves are purged and refreshed to indicate the new middleware server/RFID device associations and normal RFID network operation resumes. (Step 550.)

Figure 5C:
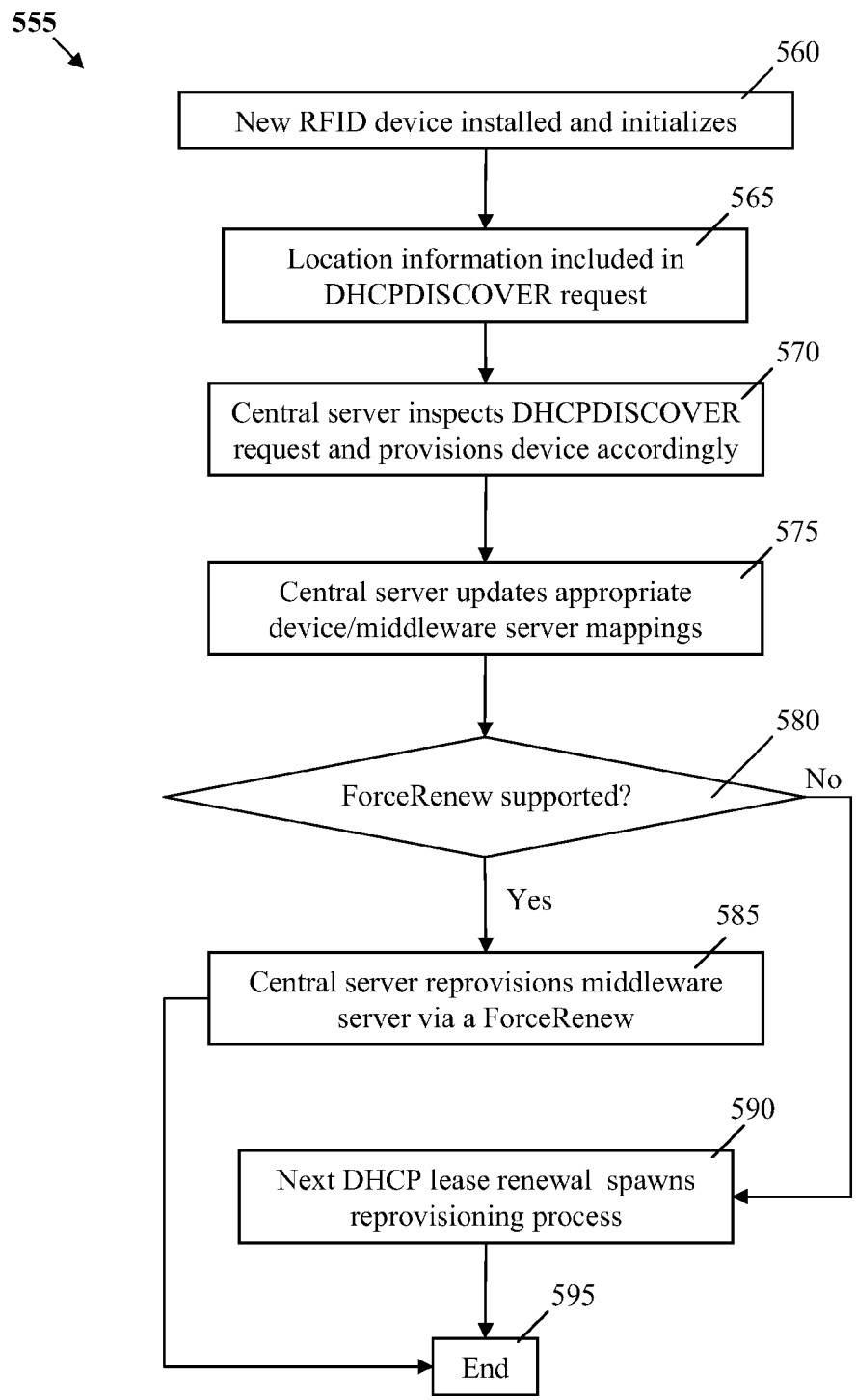

FIG. 5C outlines method 555 of the invention, which is particularly useful for accommodating RFID device population changes. In step 560, a new RFID device is connected to a switch of an RFID network and initializes. Location information and device ID information are included in a DHCPDISCOVER request (step 565) and the device is provisioned as described elsewhere herein (e.g., by a DHCP server associated with the metaserver). (Step 570.) The metaserver updates the corresponding RFID device/middleware server mappings. (Step 575.)

The middleware server will then be provisioned according to its desired functionality. In step 580, the central server determines whether the middleware server supports DHCP ForceRenew. If so, the central server immediately initiates a provisioning cycle via a ForceRenew command. (Step 585.) If the middleware server does not support DHCP ForceRenew, the middleware server is reprovisioned as soon as practicable. For example, the next DHCP lease renewal could spawn a reprovisioning process. (Step 590.)

The methods and devices of the present invention have very broad utility, both in the public and private sectors. Any enterprise needs to keep track of how its equipment is being deployed, whether that equipment is used for commercial purposes, for military purposes, etc. RFID devices that are networked according to the present invention can provide necessary information for allowing enterprises to track equipment and products (or groups of products). The information that will be provided by RFID devices that are networked according to the present invention will be of great benefit for enterprise resource planning, including the planning of manufacturing, distribution, sales and marketing.

Using the devices and methods of the present invention, RFID tags and associated RFID devices (such as RFID readers and printers) can form part of a network for tracking a product and its history. For example, instead of waiting in a checkout line to purchase selected products, a shopper who wishes to purchase products bearing RFID tags can transport the products through a door that has multiple RFID readers deployed nearby. The readers may be virtualized and data from the virtualized readers may be obtained by application software. For example, the application software may obtain EPC information regarding the products and can use this information to update a store inventory, cause a financial account to be debited, update manufacturers', distributors' and retailers' product sales databases, etc.

Read/write RFID tags can capture information regarding the history of products or groups of products, e.g., temperature and other environmental changes, stresses, accelerations and/or vibrations that have acted upon the product. It will be particularly useful to record such information for products that are relatively more subject to spoilage or other damage, such as perishable foods and fragile items. By using the methods of the present invention, this information will be used to update databases maintained by various entities (e.g., manufacturers, wholesalers, retailers, transportation companies and financial institutions). The information will be used not only to resolve disputes (for example, regarding responsibility for product damage) but also to increase customer satisfaction, to avoid health risks, etc.

Figure 6:
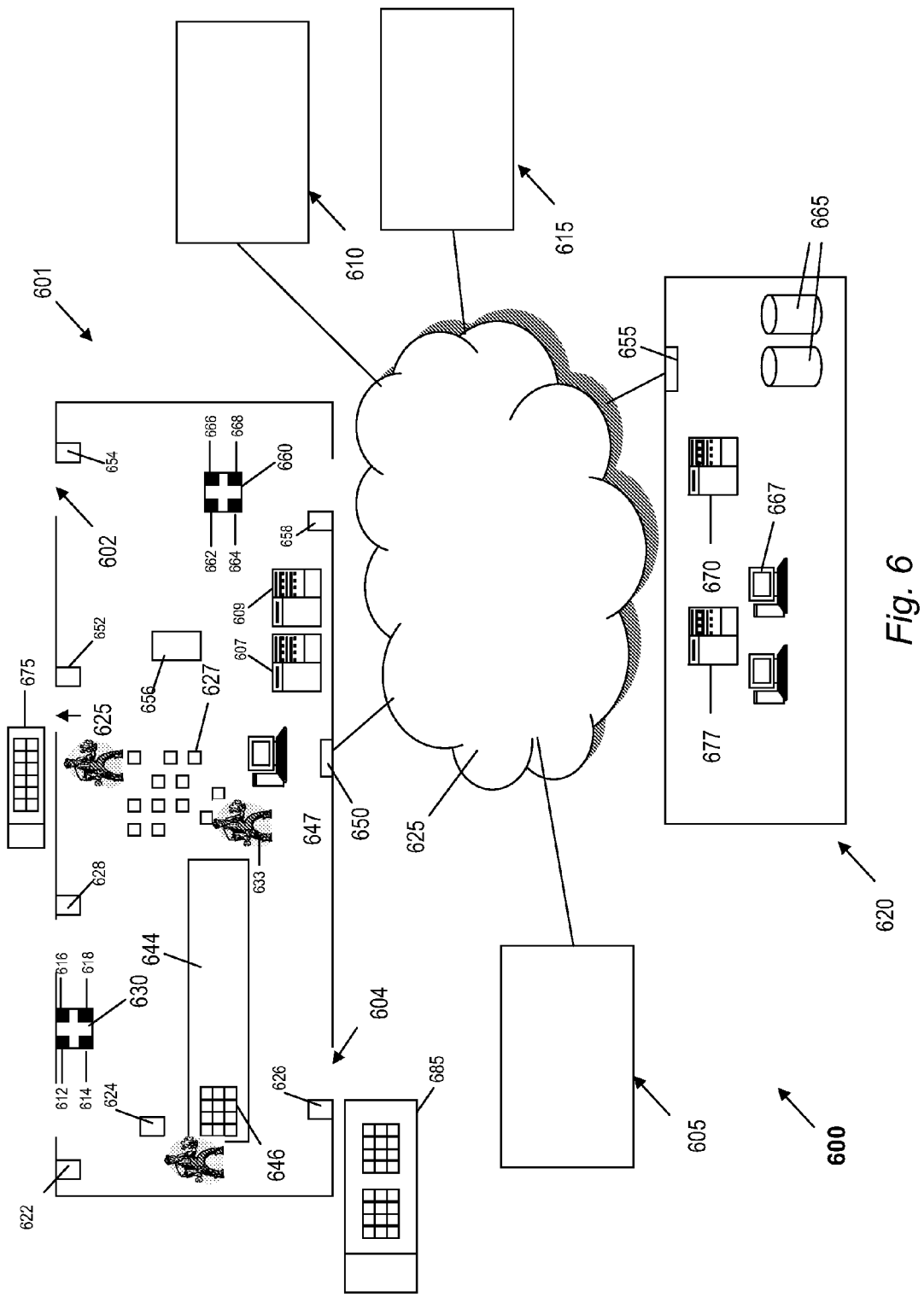
FIG. 6 illustrates another exemplary RFID network according to the present invention.

Another example of an RFID network is depicted in FIG. 6. Here, RFID network 600 includes warehouse 601, factory 605, retail outlet 610, financial institution 615 and headquarters 620. As will be appreciated by those of skill in the art, network 600 could include many other elements and/or multiple instances of the elements shown in FIG. 6. For example, network 600 could include a plurality of warehouses, factories, etc.

In this illustration, products 627 are being delivered to warehouse 601 by truck 675. Products 627, which already include RFID tags, are delivered through door 625. In this example, RFID reader 652 is connected to port 662 of switch 660.

Here, active middleware server 607 and standby middleware server 609 are connected to ports 664 and 668, respectively. Middleware server 607 provides data collection and filtering services, such as taking out redundancies, searching for particular RFID tag reads, etc. Only a portion of the data received by a middleware server is routinely made available to higher-level applications. Accordingly, middleware server 607 filters the RFID reads from RFID readers in warehouse 601 and transmits only selected reads to headquarters 620. In this example, headquarters 620 includes storage devices 665, workstations 667, metaserver 670 and application server 677.

Here, switches 630 and 660 are connected to the rest of RFID network 600 via gateway 650 and network 625. Network 625 could be any convenient network, but in this example network 625 is the Internet. RFID reader 652 reads each product that passes through door 625 and transmits the EPC code corresponding to each product on RFID network 600.

RFID tags may be used for different levels of a product distribution system. For example, there may be an RFID tag for a pallet of cases, an RFID tag for each case in the pallet and an RFID tag for each product. Accordingly, after products 627 enter warehouse 601, they are assembled into cases 646. RFID printer 656 makes an RFID tag for each of cases 646. In this example, RFID printer 656 is connected to port 666 of switch 660. RFID printer 656 could operate under the control of PC 647 in warehouse 601, one of PCs 667 in headquarters 620, or some other device.

RFID reader 624, which is connected to port 614 of switch 630, reads the EPC code of each case 646 and product 627 on conveyor belt 644 and transmits this information to middleware server 607. Similarly, RFID reader 626, which is connected to port 616, reads the EPC code of each case 646 and product 627 that exits door 604 and transmits this information to middleware server 607. Cases 646 are loaded onto truck 685 for distribution to another part of the product chain, e.g., to retail outlet 610.

Each of the RFID devices in network 600 preferably has a "personality" suitable for its intended use. For example, device 652 could cause reassuring tone to sound and/or a green light to flash if an authorized person or object enters door 625. However, device 652 might cause an alarm to sound and/or an alert to be sent to an administrator on network 600 if a product exits door 625 or an unauthorized person enters or exits door 625.

Figure 7:
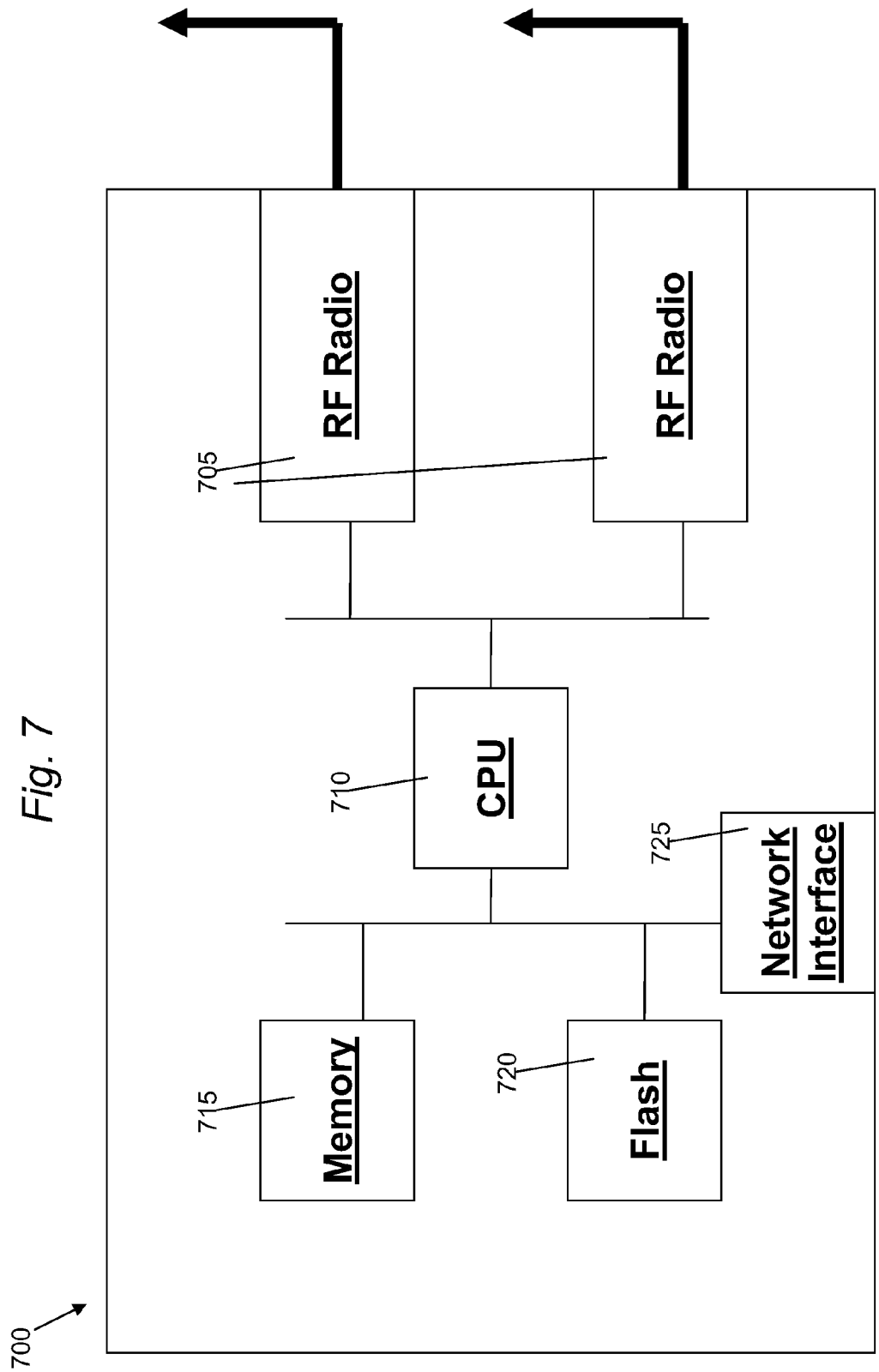
FIG. 7 is a block diagram of an exemplary RFID reader that may be configured to perform some methods of the present invention.

FIG. 7 illustrates an RFID reader that can be configured to perform methods of the present invention. RFID reader 700 includes one or more RF radios 705 for transmitting RF waves to, and receiving modulated RF waves from, RFID tags. RF radios 705 provide raw RF data that is converted by an analog-to-digital converter (not shown) and conveyed to other elements of RFID reader 700. In some embodiments, these data are stored, at least temporarily, by CPU 710 in memory 715 before being transmitted to other parts of RFID network 200 via network interface 725. Network interface 725 may be any convenient type of interface, such as an Ethernet interface.

Flash memory 720 is used to store a program (a "bootloader") for booting/initializing RFID reader 700. The bootloader, which is usually stored in a separate, partitioned area of flash memory 720, also allows RFID reader 700 to recover from a power loss, etc. In some embodiments of the invention, flash memory 720 includes instructions for controlling CPU 710 to form "DHCPDISCOVER" requests, as described elsewhere herein, to initiate a provisioning/configuration cycle. In some implementations, flash memory 720 is used to store personality information and other configuration information obtained from, e.g., a DHCP server during such a cycle.

However, in preferred implementations, such information is only stored in volatile memory 715 after being received from, e.g. a DHCP server. There are advantages to keeping RFID devices "dumb." For example, a network of dumb RFID devices allows much of the processing load to be centralized (e.g., performed by server 270 of network 200), instead of being performed by the RFID devices. Alternatively, the processing load can be decentralized, but only to trusted devices (such as PC 247 of network 200).

Configuration information is downloaded from, e.g., a central server to memory 715. Updates may be instigated by the central server or selected, trusted devices. New versions of the image file (e.g., the running, base image necessary to operate the RFID device) are copied into flash memory 720. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 8:
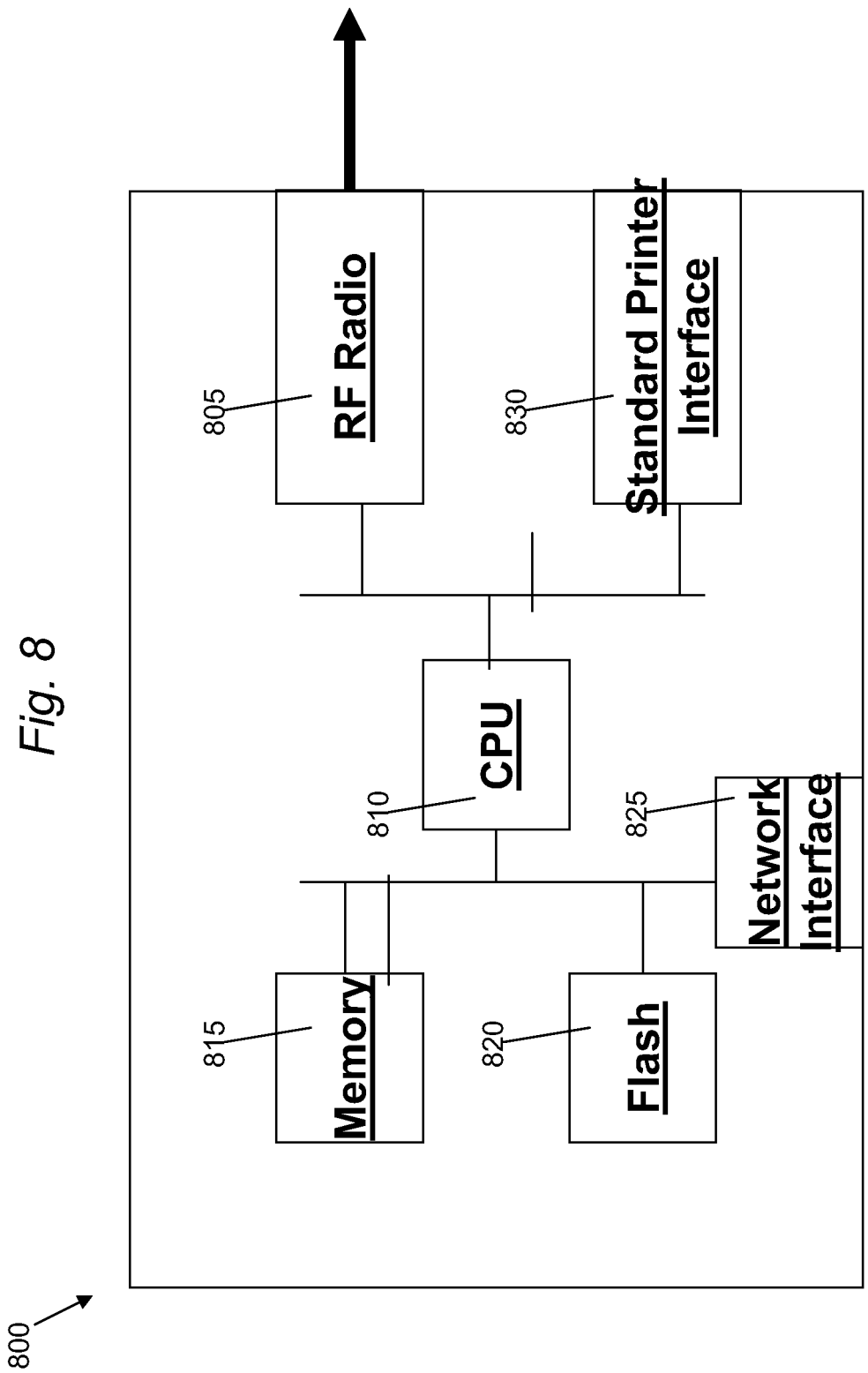
FIG. 8 is a block diagram of an exemplary RFID printer that may be configured to perform some methods of the present invention.

FIG. 8 is a block diagram illustrating an exemplary RFID printer 800 that may be configured to perform some methods of the present invention. RFID printer 800 has many of the same components as RFID reader 700 and can be configured in the same general manner as RFID reader 700.

RFID printer also includes printer interface 830, which may be a standard printer interface. Printer interface prints a label for each RFID tag, e.g. according to instructions received from network 200 via network interface 825.

RF Radio 805 is an outbound radio that is used to send RF signals to the antenna of an RFID tag under the control of CPU 810, thereby encoding information (e.g. an EPC) on the tag's microprocessor. Preferably, RF Radio 805 then checks the encoded information for accuracy. The RFID tag is sandwiched within the label produced by printer interface 830.

Figure 9:
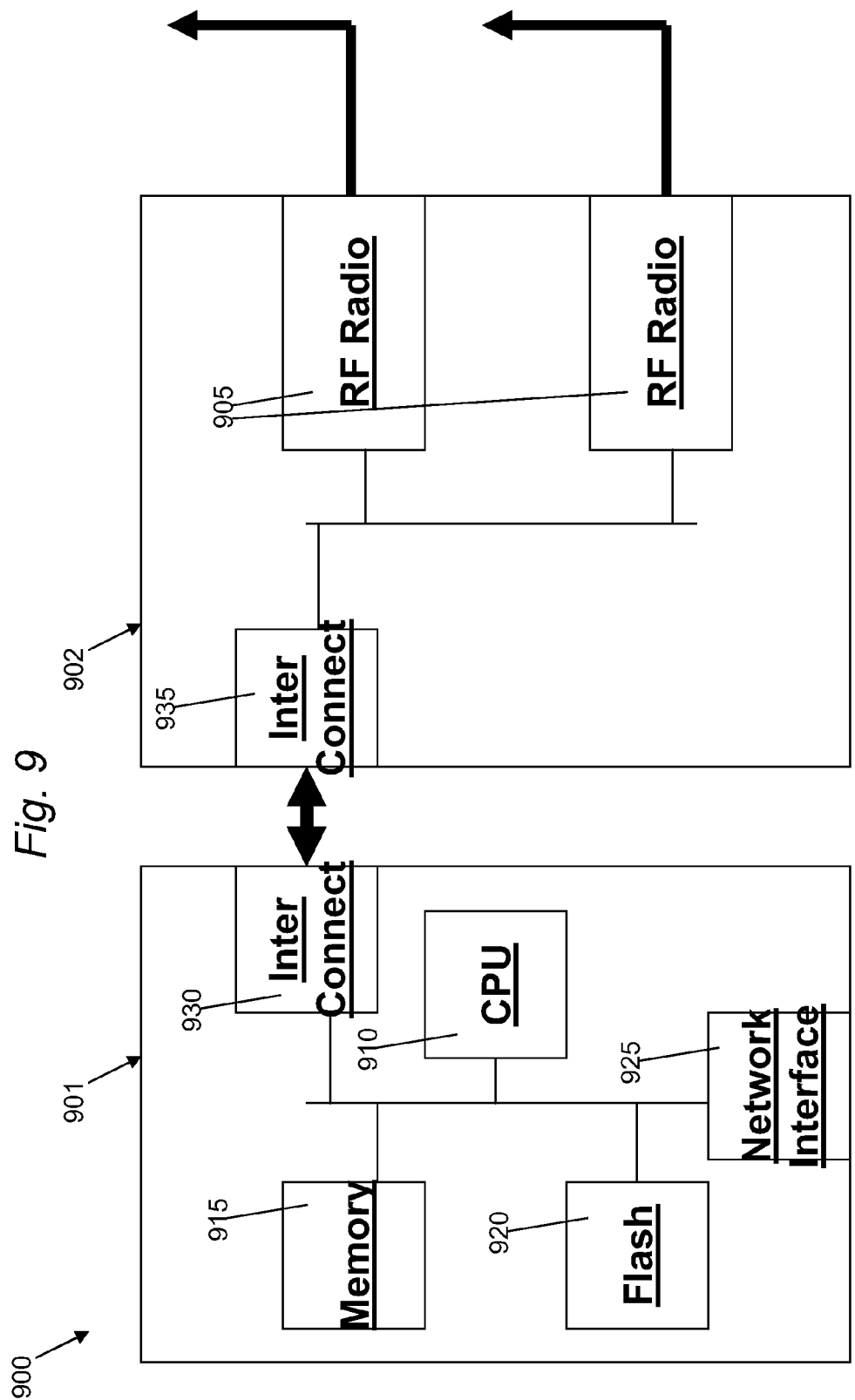
FIG. 9 is a block diagram of an exemplary RFID system that may be configured to perform some methods of the present invention.

FIG. 9 illustrates RFID system 900 that includes control portion 901 and RF radio portion 902. The components of control portion 901 are substantially similar to those described above with reference to FIGS. 7 and 8. Interconnect 930 of control portion 901 is configured for communication with interconnect 935 of RF radio portion 902. The communication may be via any convenient medium and format, such as wireless, serial, point-to-point serial, etc. Although only one RF radio portion 902 is depicted in FIG. 9, each control portion 901 may control a plurality of RF radio portions 902. RFID system 900 may be deployed on a single framework or chassis (e.g., on a forklift) or in multiple chassis.

Figure 10:
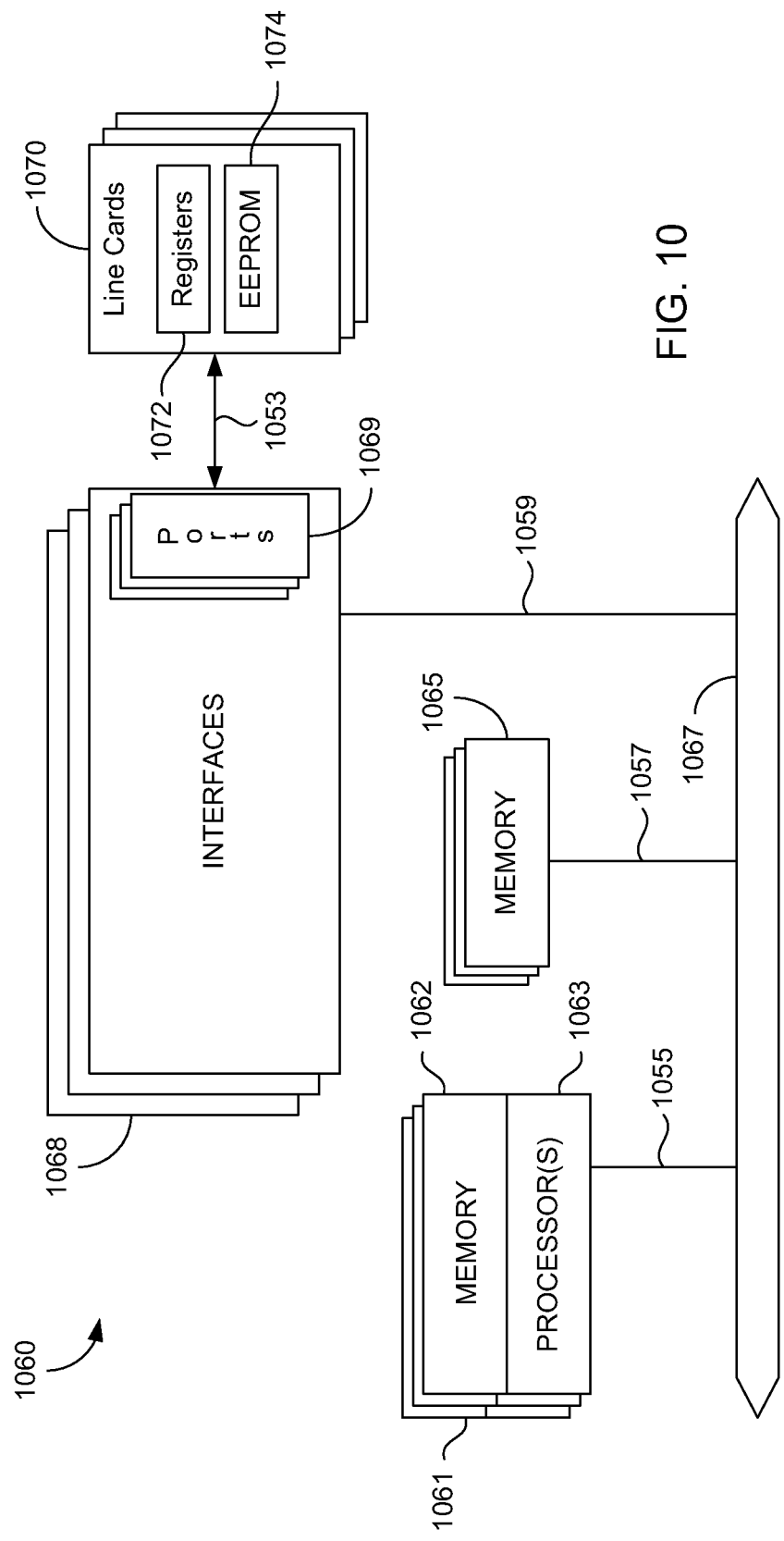
FIG. 10 illustrates an example of a network device that may be configured to implement some methods of the present invention.

FIG. 10 illustrates an example of a network device that may be configured to implement some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor 1074 and, in some instances, volatile RAM. Independent processors 1074 may be, for example ASICs or any other appropriate processors. According to some such embodiments, these independent processors 1074 perform at least some of the functions of the logic described herein. In some embodiments, one or more of interfaces 1068 control such communications-intensive tasks as media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "line cards"). Generally, interfaces 1068 control the sending and receiving of data packets over the network and sometimes support other peripherals used with the network device 1060. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system (e.g. Linux, VxWorks, etc.), and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 10) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

I claim:

1. A method, comprising:
    allocating service of radio frequency identification ("RFID") devices associated with a first RFID middleware server to a second RFID middleware server in response to a failure condition; and
    enabling a second switch port in communication with the second RFID middleware server for communication with the allocated RFID devices.

2. The method of claim 1, further comprising determining a failure of the first RFID middleware server, the failure of the first RFID middleware server at least in part characterizing the failure condition.

3. The method of claim 2, wherein at least one of determining, allocating and enabling are performed without explicit system control.

4. The method of claim 2, wherein the determining step comprises at least one of receiving a change-of-state message from the switch or a failure determination by a monitor.

5. The method of claim 4, wherein the change-of-state message comprises at least one of an SNMP trap or an indication of a lack of heartbeat.

6. The method of claim 1, further comprising disabling a first switch port of a switch in communication with the first RFID middleware server based at least in part on the failure condition.

7. The method of claim 6, further comprising provisioning the second RFID middleware server at least in response to the failure condition.

8. The method of claim 7, wherein at least one of disabling the first port, re-assigning, instructing the switch to enable the second port, and provisioning are performed without explicit system control.

9. A central server, comprising:
    memory for storing middleware server configuration, ID and location information, and for storing associations of middleware servers and RFID devices;
    a port configured for communication with an RFID network, the RFID network comprising an active middleware server connectable to a switch via a first switch port, a standby middleware server connectable to the switch via a second switch port and a plurality of RFID devices associated with and in communication with the active middleware server; and
    at least one logic device configured to: re-assign at least a portion of the plurality of RFID devices to the standby middleware server in response to a failure condition; and instruct the switch to enable the second port.

10. The central server of claim 9, wherein the logic device is further configured to determine a failure of the first middleware server, the failure of the first middleware server at least in part characterizing the failure condition.

11. The central server of claim 10, wherein the determining logic comprises at least one of receiving a change-of-state message from the switch or a failure determination by a monitor.

12. The central server of claim 11, wherein the change-of-state message comprises at least one of an SNMP trap or an indication of a lack of heartbeat.

13. The central server of claim 9, wherein the logic device is further configured to instruct the switch to disable the first port of the switch in communication with the first middleware server based at least in part on the failure condition.

14. The central server of claim 9, wherein the logic device is further configured to provision the standby middleware server at least in response to the failure condition.

15. The central server of claim 9, wherein the logic device is further configured to at least one of perform said re-assigning and instructing without further explicit feedback or instructions.

16. A non-transitory computer-readable medium storing thereon computer-readable instructions, comprising:
    instructions for allocating radio frequency identification ("RFID") devices formerly associated with a first RFID middleware server to a second RFID middleware server at least in response to a failure condition;
    instructions for enabling a second switch port in communication with the second RFID middleware server; and
    instructions for provisioning the second RFID middleware server.

17. The non-transitory computer-readable medium of claim 16, further comprising instructions for determining a failure of the first RFID middleware server, the failure of the first RFID middleware server at least in part characterizing the failure condition.

18. The non-transitory computer-readable medium of claim 17, wherein determining a failure of the first middleware server comprises at least one of receiving a change-of-state message from the switch or a failure determination by a monitor.

19. The non-transitory computer-readable medium of claim 18, wherein the change-of-state message comprises at least one of an SNMP trap or an indication of a lack of heartbeat.

20. The non-transitory computer-readable medium of claim 16, further comprising instructions for disabling a first switch port of a switch in communication with the first RFID middleware server at least in response to the failure condition.

* * * * *